United States Patent
Steiner et al.

(10) Patent No.: US 11,314,651 B2
(45) Date of Patent: Apr. 26, 2022

(54) MEASUREMENT SYSTEM AND METHOD FOR OPERATING A MEASUREMENT SYSTEM

(71) Applicant: TURCK Holding GmbH, Halver (DE)

(72) Inventors: Rene Steiner, Hagen (DE); Christoph Schmermund, Essen (DE); Peter Strunkmann, Detmold (DE)

(73) Assignee: TURCK HOLDING GMBH, Halver (DE)

( * ) Notice: Subject to any disclaimer, the term of this patent is extended or adjusted under 35 U.S.C. 154(b) by 90 days.

(21) Appl. No.: 16/745,389

(22) Filed: Jan. 17, 2020

(65) Prior Publication Data
US 2020/0233809 A1 Jul. 23, 2020

(30) Foreign Application Priority Data
Jan. 17, 2019 (DE) ...................... 10 2019 101 117.5

(51) Int. Cl.
*G06F 12/0875* (2016.01)
*G01D 21/02* (2006.01)

(52) U.S. Cl.
CPC ......... *G06F 12/0875* (2013.01); *G01D 21/02* (2013.01)

(58) Field of Classification Search
CPC .................................................. G06F 12/0875
USPC ......................................................... 711/118
See application file for complete search history.

(56) References Cited

U.S. PATENT DOCUMENTS

| 5,197,145 | A | * | 3/1993 | Kitamura | ............ | G06F 12/0846 |
| | | | | | | 711/143 |
| 2007/0178864 | A1 | * | 8/2007 | Kiehl | .................... | G06F 13/385 |
| | | | | | | 455/186.1 |
| 2012/0226920 | A1 | * | 9/2012 | Strumpf | ................... | H04B 3/54 |
| | | | | | | 713/300 |

* cited by examiner

*Primary Examiner* — Jae U Yu
(74) *Attorney, Agent, or Firm* — Leydig, Voit & Mayer, Ltd.

(57) ABSTRACT

Provided is a method for operating a measurement system including an evaluation module and several measuring elements. The evaluation module and the measuring elements are connected via a communication line. The method includes detecting measurement data via the several measuring elements. At least two of the measuring elements detect the measurement data at least partially at the same time. The method further includes: buffering the detected measurement data in the respective measuring element; and reading out the measurement data buffered in the measuring elements with the evaluation module via the communication line.

17 Claims, 3 Drawing Sheets

MEASUREMENT SYSTEM AND METHOD FOR OPERATING A MEASUREMENT SYSTEM

CROSS-REFERENCE TO PRIOR APPLICATION

Priority is claimed to German Patent Application No. DE 10 2019 101 117.5, filed on Jan. 17, 2019, the entire disclosure of which is hereby incorporated by reference herein.

FIELD

The present invention relates to a measurement system and a method for operating a measurement system for industrial automation technology.

BACKGROUND

In the state of the art, measurement systems are known which have a plurality of measuring elements. In order to actuate the individual measuring elements, an evaluation module is typically required, which sends commands to the measuring elements and receives measurement data, which are sent to the evaluation module by the measuring elements. The measuring elements can be RFID read/write heads, for example, with which items of information can be read out of or written into RFID tags. Thus, for example, RFID read/write heads can be attached to production lines in order thus to identify workpieces and/or other objects on or in the production line by means of an RFID tag and/or to read out other items of information therefrom.

For example, the BL IDENT RFID system from HANS TURCK GmbH & Co. KG represents a measurement system which has several measuring elements formed as RFID read/write heads, which are actuated by means of an evaluation module. Each measuring element is connected to the evaluation module via a separate channel, via which the evaluation module can provide the measuring element with commands and the measuring element can send measurement data to the evaluation module. Distributor modules can also be used by means of which several read/write heads or measuring elements, for example up to 32, can be connected to each channel or to an evaluation module. However, only one measuring element can be active for each channel at any time, while the other measuring elements must be inactive.

According to a further measurement system known in the state of the art from BALLUFF with BALLUFF EASY LOOP technology, up to 32 read/write heads can be used on one evaluation module using expander modules. For the transmission of data from the measuring elements to the evaluation module, it is necessary for the measuring elements to form a data chain from individual telegrams. The items of information are sent from one measuring element to the next measuring element in the channel. For this purpose, a measuring element receives the data chain formed from the individual telegrams from the previous measuring element, attaches its own individual telegram and forwards the data chain extended in this way to the next measuring element, until finally the last measuring element in the ring or in the channel sends the complete data chain to the evaluation module. In other words, this technology requires that the measurement data of all measuring elements is always sent in a complete data chain. The targeted, separate sending of the items of information from one measuring element to the evaluation module is thus not possible.

SUMMARY

In an embodiment, the present invention provides a method for operating a measurement system including an evaluation module and several measuring elements. The evaluation module and the measuring elements are connected via a communication line. The method includes detecting measurement data via the several measuring elements. At least two of the measuring elements detect the measurement data at least partially at the same time. The method further includes: buffering the detected measurement data in the respective measuring element; and reading out the measurement data buffered in the measuring elements with the evaluation module via the communication line.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1A:
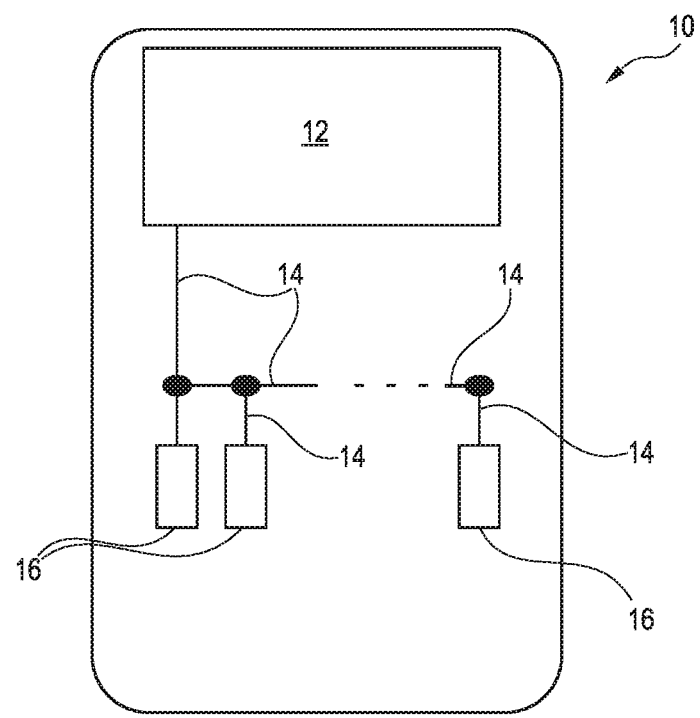
FIGS. 1A and 1B respectively depict a measurement system in a schematic and a perspective representation, according to an embodiment.

An object of an embodiment of the present invention is to provide a measurement system and a method for operating a measurement system which offers greater flexibility for operating the measuring elements and makes possible a more efficient provision of the measurement data.

In an embodiment, the invention provides a method for operating a measurement system with an evaluation module and several measuring elements, wherein the evaluation module and the measuring elements are connected via a communication line. The method includes detecting measurement data by means of the several measuring elements, wherein at least two of the measuring elements detect the measurement data at least partially at the same time. The method further includes buffering the detected measurement data in the respective measuring element, as well as reading out the measurement data buffered in the measuring elements by means of the evaluation module via the communication line.

In an embodiment, the invention provides a measurement system with an evaluation module, several measuring elements and a communication line, which connects the evaluation module and the several measuring elements. The measuring elements are set up in each case to detect measurement data, wherein the detection of the measurement data by the several measuring elements is effected at least partially at the same time, and wherein the measuring elements are set up to buffer the detected measurement data in the respective measuring element. The evaluation module is set up to read out the measurement data buffered in the measuring elements via the communication line.

In an embodiment, the invention provides a computer program product which comprises a non-volatile, computer-readable memory medium on which an executable program code is saved, which is configured to prompt a measurement system to carry out a method according to the invention.

An evaluation module can in particular be formed as a control unit and/or have a processing unit. The evaluation module is preferably set up to send commands, such as control commands, to the measuring elements and preferably to read out or to receive data from the measuring elements. In particular, the evaluation module and/or the measurement system can be set up to forward similar commands and/or the same command to all measuring elements connected to it at the same time. For example, the evaluation module and/or the measurement system can be set up to forward a command in such a way that all measuring elements receive this one command. The fact that the measuring elements receive the command at the same time or simultaneously means that the command is sent to all measuring elements at the same time. The exact time of receipt by the individual measuring elements can differ from each other due to technical circumstances, such as due to a finally rapid transfer rate and different transfer times to the various measuring elements. Nevertheless, this is understood to be simultaneous.

The measuring elements preferably have sensors and/or antennas and are preferably set up to detect measurement data. For example, the measuring elements can be set up to detect environmental parameters, such as for example a temperature, an air humidity, an electrical field, a magnetic field, a mechanical contact, a force, electromagnetic waves, optical radiation, infrared radiation, ultraviolet radiation, x-ray radiation, radioactive radiation and/or combinations thereof. The measuring elements can preferably have an RFID read/write head or be formed as such and in particular be designed to read out an RFID tag located in a read/write area of the RFID read/write head and/or to write data onto it. The measuring elements can all be formed similar or different. For example, similar measuring elements can be used in order to carry out the same activities or operations in parallel, for example on several parallel production lines. Alternatively, different measuring elements can preferably be combined in a measurement system in order for instance to detect different measurement data.

A communication line is preferably a network or a part thereof, and makes possible in particular the electronic exchange of items of information between the evaluation module and the measuring elements and preferably, but not necessarily, between the measuring elements themselves. The communication line can be formed wired and/or wireless. The communication line can preferably be set up to connect the measuring elements to the evaluation module in series or in parallel. In particular, the communication line can be formed as a bus system and/or comprise a bus system or be formed as part of a bus system. For example, the communication line can be set up as an HF bus system or comprise such a thing. For example, the communication line and/or the measurement system can be formed in accordance with the RS-485 or RS-232 standard.

The fact that measurement data are detected "at least partially at the same time" means that the detection of measurement data by at least two measuring elements is effected overlapping in time. In other words, measurement data are not detected exclusively in series, i.e. one after the other, but at least partially in parallel, with the result that at least two of the several measuring elements are active at least at some points in time. The detection of the measurement data by the several measuring elements does not necessarily need to be effected completely synchronously, although this is the case according to a preferred embodiment. The detection of measurement data by all measuring elements is preferably effected at least partially simultaneously. The measuring elements will preferably be operated in parallel, that is they execute the same commands and/or activities at the same time.

The buffering of the detected measurement data means that they are first of all saved temporarily in the respective measuring element instead of being transferred immediately to the evaluation module. In other words, the detected measurement data are first of all stored in the measuring element and held such that they can then be retrieved or read out by the evaluation module, or are sent by the evaluation module to the evaluation module, on request.

The fact that the buffered measurement data are read out by means of the evaluation module means that the evaluation module becomes active in order to extract the buffered measurement data from the measuring elements. The measuring elements preferably assume only a passive role in the reading out. The reading out of the measurement data by means of the evaluation module is preferably effected on the initiative of the evaluation module. Alternatively, the measuring elements send the buffered measurement data to the evaluation module after they have been prompted to do so by the evaluation module through a corresponding command. Independent sending of the measurement data by the measuring elements without a prior request by the evaluation module does not take place, however.

An embodiment of the invention offers the advantage that the several measuring elements can be operated in parallel and at least partially at the same time and the measurement data can nevertheless be provided in an ordered manner. Because the buffered measurement data are read out by means of the evaluation module, it is not necessary for the individual measuring elements to transmit the measurement data to the evaluation module via the communication line and/or to feed the measurement data into the communication line on their own initiative, whereby a loss of data or a loss of the assignability of the transferred measurement data can be prevented.

An embodiment of the invention also offers the advantage that the measurement data of the individual measuring elements can be read out in a targeted manner, without the measurement data of all measuring elements having to be read out for this purpose. A targeted and/or quicker reading out of the measurement data of individual measuring elements can be effected in this way. In other words, transmission of items of information from the measuring elements to the evaluation module is preferably only effected when relevant data, in particular measurement data, are present. This can be the case in particular when measurement data have been detected and buffered, in particular when, for example, a data carrier or RFID chip has been read out by a measuring element. If no relevant data, in particular no measurement data, are present in a measuring element, i.e. have been buffered, there is preferably no transmission of items of information from the measuring elements to the evaluation module via the communication line. There is therefore no need to read out the measurement data of all measuring elements by means of a data chain.

Furthermore, an embodiment of the invention offers the advantage that it is possible for the read-out measurement data to be reliably assigned to the respective measuring elements, since the evaluation module can address and read out the individual measuring elements in a targeted manner, without further measuring elements having to be addressed for the reading out process. The reading out of the measurement data buffered in the measuring elements is preferably effected sequentially. The measurement data are preferably read out from the individual measuring elements one after the other.

In addition, an embodiment of the invention offers the advantage that a parallel detection of measurement data by the several measuring elements can be achieved since each measuring element can detect measurement data without thereby interfering with the communication line and/or the other measuring elements. Because the measuring elements first of all buffer the detected measurement data, and the reading out by means of the evaluation module can be effected in an ordered manner, a parallel operation of the measuring elements can be effected without interfering with the communication and/or the communication line.

The buffering of the detected measurement data is preferably effected in a buffer memory of the respective measuring element. For example, the measuring elements can be equipped with a memory module for this purpose, such as a flash memory and/or a RAM memory.

At least one of the measuring elements preferably detects measurement data again after buffering is complete. In other words, the detection and buffering of the measurement data is preferably effected several times in succession and/or continuously. The steps of detecting the measurement data and of buffering by at least one of the measuring elements are particularly preferably effected continuously in an alternating sequence. This can be carried out until an exit condition is met, for example. A command to end the detection of measurement data and/or a reset command and/or the passing of a predetermined period of time can represent such an exit condition, for example. This makes it possible to carry out the detection and buffering in a continuous mode until the adjustment of the detection is instructed by means of a further command or until a particular period of time has passed. In other words, at least one of the commands is formed as a continuous mode command and prompts the measuring elements alternately to detect and buffer measurement data continuously. The communication required for the provision of the commands can thereby be correspondingly reduced.

Preferably, the method further comprises the provision of at least one command to the several measuring elements by means of the evaluation module, wherein the provision of the at least one command to the measuring elements is effected via the communication line. In other words, the evaluation module preferably also sends one or more commands to the several measuring elements via the communication line. For example, the provision of a command can precede the detection and buffering of measurement data by the measuring elements and prompt the measuring elements to detect and buffer the measurement data when executing the command. Alternatively or in addition, when executed, a command can prompt the measuring elements to adjust the detection and/or buffering of the measurement data. This offers the advantage that the communication line can also be used for the provision of the commands.

The reading out of the buffered measurement data preferably comprises fragmentation of the measurement data into fragments and successive reading out of the fragments. This offers the advantage that measurement data can then also be reliably read out when the size or data quantity thereof is too large to be transferred as a whole via the communication line. For example, a bus system can be used, of which the maximum size of the transferable data packets is smaller than the data quantity of the measurement data. Through the fragmentation of the measurement data into fragments with a size or data quantity which is smaller than or equal to the maximum transferable data packets, the measurement data can nevertheless be reliably read out.

The measuring elements preferably each have a buffer memory and are set up to buffer the detected measurement data in the respective buffer memory. This offers the possibility of holding the detected measurement data until they are read out by the evaluation module. According to a preferred embodiment, the buffer memory can be limited such that only measurement data from one or more detection procedures can be buffered in the buffer memory. This offers the possibility of limiting the hardware requirements of the buffer memory, such as its memory capacity, and thereby reducing the production costs, for example. The oldest buffered measurement data which are located in the buffer memory are preferably overwritten by new detected measurement data when the buffering of the new detected measurement data would exceed the memory capacity. This makes an efficient usage of the buffer memory possible and maximizes the holding time of the buffered measurement data in order that they can also be read out by the evaluation module in the case of a time-delayed reading out procedure.

The evaluation module preferably has a memory unit and is set up to save the measurement data read out from the measuring elements in the memory unit. The memory unit particularly preferably has a FIFO buffer. A FIFO buffer is a "First-In-First-Out buffer" in which the sequence of reading the data out of the buffer corresponds to the sequence of data input.

At least some of the measuring elements preferably each have a read/write head or are formed as such. The read/write heads are particularly preferably set up to read out an RFID element, such as an RFID tag and/or an RFID chip.

FIG. 1A shows a measurement system 10 according to a preferred embodiment in a schematic representation. The measurement system 10 has an evaluation module 12, which is connected to several measuring elements 16 via a communication line 14. Although three measuring elements 16 are shown in the representation shown, in other embodiments only two measuring elements 16 or more than three measuring elements 16 can be connected to the evaluation module 12 via the communication line 14. The communication line 14 makes possible communication and a data exchange between the measuring elements 16 and the evaluation module 12, with the result that the evaluation module 12 can send commands to individual measuring elements 16 or to all measuring elements 16, and can read out measurement data buffered in the measuring elements 16.

The measuring elements 16 are formed similar or different, that is the measurement system 10 either has only similar measuring elements 16, or comprises different measuring elements 16.

The measuring elements 16 preferably each have at least one memory element (not shown), which can serve as a buffer memory in order, for instance, to buffer received commands and/or detected measurement data in the measuring element 16. The measurement data detected by the measuring element can in particular be buffered until they are read out by the evaluation module 12.

Figure 1B:
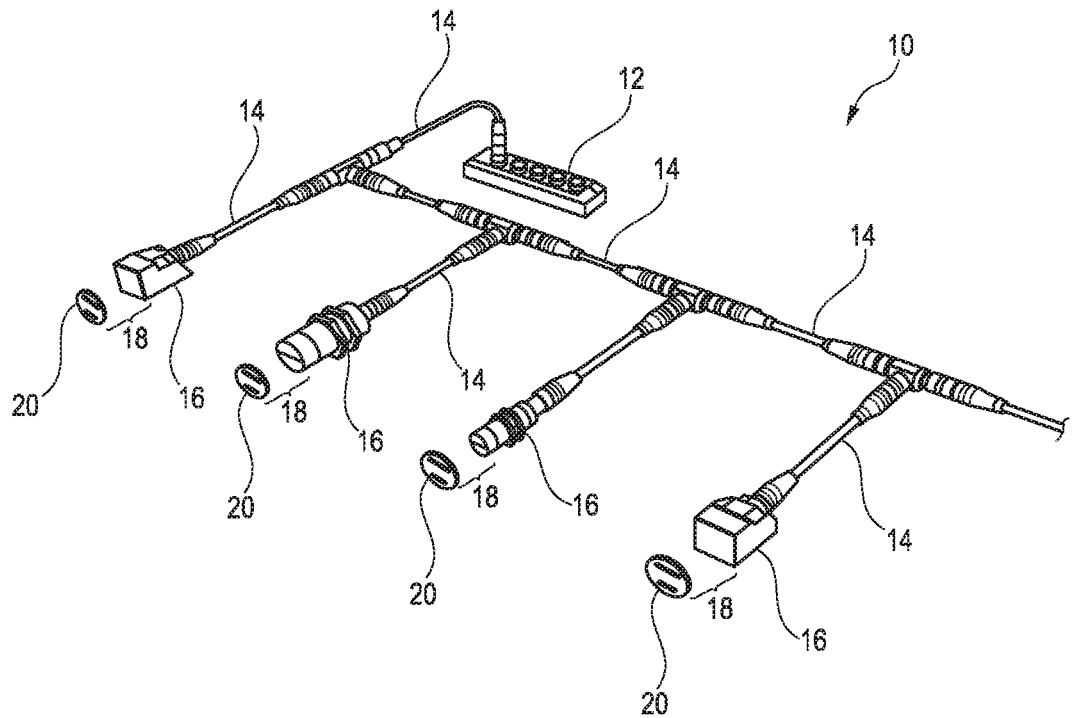

FIG. 1B shows a measurement system 10 according to a preferred embodiment in a perspective representation. According to this preferred embodiment, the measuring elements 16 are formed as read/write heads in order to be able to read out RFID chips, when the latter are located in a read/write area close to the respective measuring element 16. According to the embodiment shown, the measuring elements 16 are formed as at least partially different read/write heads. The measuring elements 16 can differ from each other both in their shape and in their function. For example, the measuring elements can be formed as different read/write heads in order to be able to read out different RFID chips and/or in order to provide differently formed read/write areas. The latter can be achieved, for example, in that the read/write heads can establish a radio connection with RFID chips with different sized ranges.

The evaluation module is preferably equipped with a memory unit, at least in order to save and/or buffer the measurement data read out from the measuring elements. The memory unit of the evaluation module 14 is preferably set up as a FIFO buffer or circular buffer in which the saved data are removed or deleted or overwritten in the same sequence in which they entered the buffer. The evaluation module is preferably further set up to send commands to the measuring elements 16 and in this way to actuate the measuring elements 16.

According to the embodiment shown, the communication line is formed as a cable connection. The cable connection can comprise several segments which are joined to form the communication line or cable connection. This offers the advantage that the cable connection can be lengthened or adapted by means of individual segments, if required. For example, the communication line 14 can connect the measuring elements 16 to the evaluation module in such a way that the measuring elements 16 are connected in series or serially. Preferably, in a measurement system 10, up to 32 measuring elements 16, in particular read/write heads, can be connected by means of a communication line or in a bus to an evaluation module 12. According to some preferred embodiments, the use of T-pieces and/or of a terminator can be advantageous and/or necessary. The measurement system 10 can preferably be formed in accordance with the RS-485 standard.

The measurement system 10 preferably supports the reading out and/or writing of a Unique ID, i.e. an item of information stored in the data carrier or RFID chip for the identification of the data carrier or RFID chip, and/or of user data on the data carrier or RFID chip by means of the measuring elements 16. The reading and/or writing of at least 64 bytes of data per procedure is particularly preferably supported. If the data to be read and/or to be written is greater than a maximum data quantity that can be read and/or written in each procedure, the measurement system 10 can preferably fragment the data to be read and/or to be written in order to divide the data into readable and/or writable data packets. The fragmentation is particularly preferably effected in the measuring element in which the buffered measurement data can preferably be fragmented, if required. The buffered measurement data can also preferably be fragmented in the measuring element in order to make reading out by means of the evaluation module easier and/or possible. This can be advantageous in particular when a maximum data quantity for reading out the buffered measurement data is smaller than the data quantity of buffered measurement data.

Figure 2A:
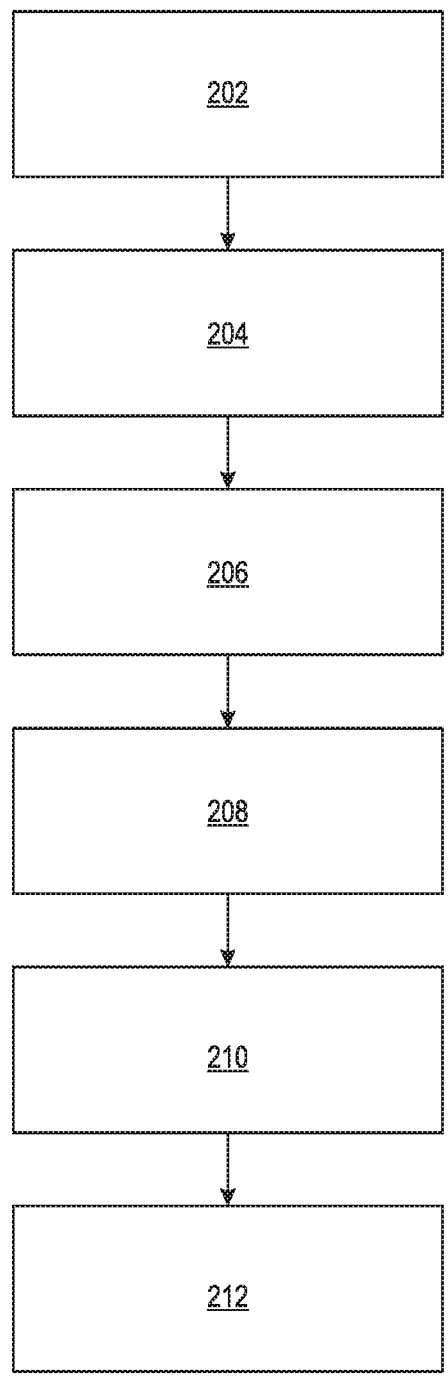
FIGS. 2A and 2B depict a schematic illustration of a method according to an embodiment.
Figure 2B:
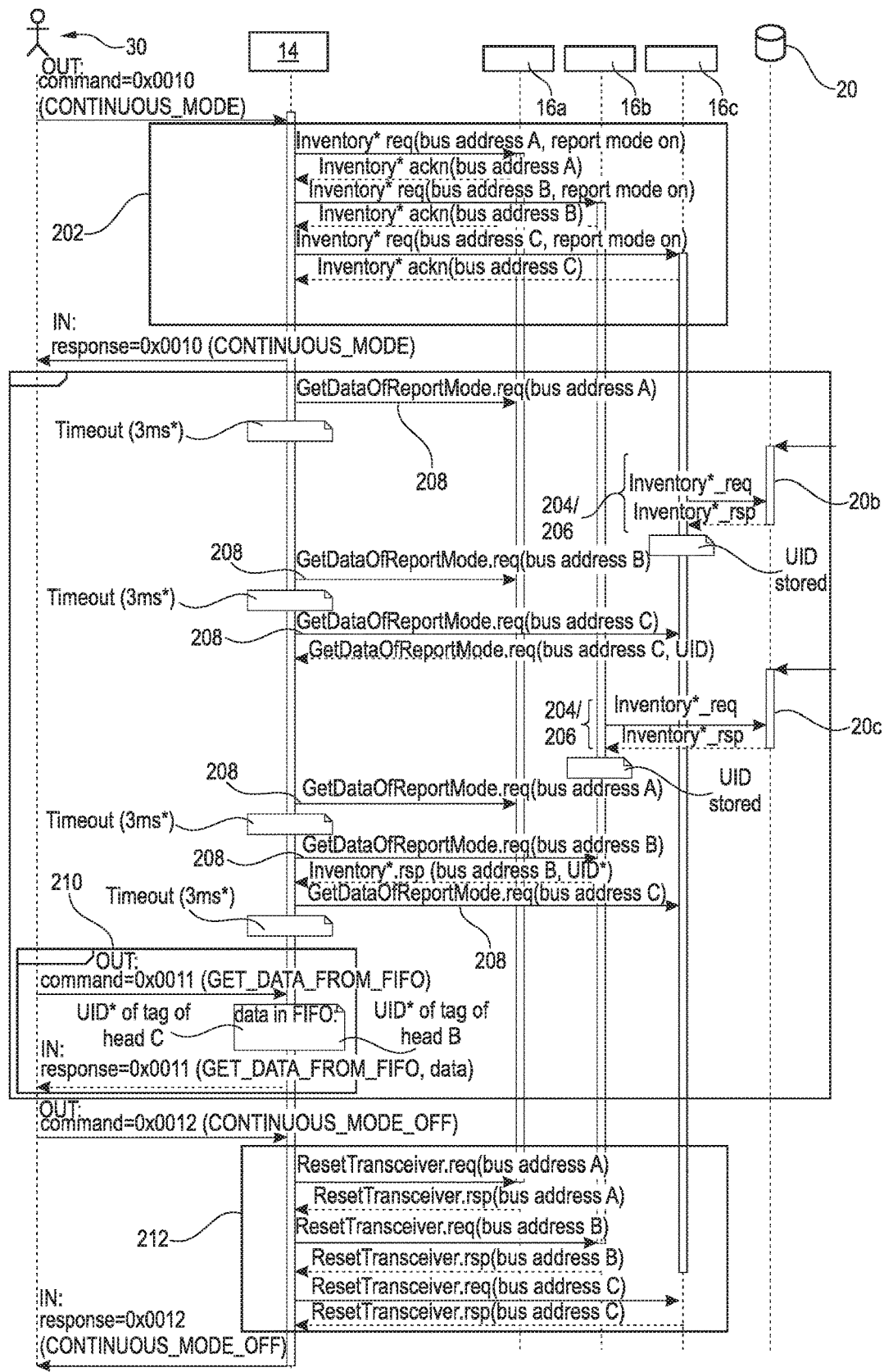

With reference to FIGS. 2A and 2B, a preferred method for operating a measurement system is described in the following. FIG. 2A shows, in a schematic diagram, the sequence of the individual method steps 202 to 212. FIG. 2B shows, in a block diagram provided with exemplary program text, the method sequence with reference to commands and notifications which are transferred at least partially via the communication line 14.

The measurement system 10 which can be operated using the preferred method has an evaluation module 12 and several measuring elements 16, wherein the measuring elements 16 are connected to the evaluation module 12 via a communication line 14. The measurement system 10 is particularly preferably formed according to the embodiment shown in FIG. 1A or 1B.

FIG. 2B shows a user 30, who can control the measurement system 10 by means of command entries, with the result that the evaluation module 12 can actuate the measuring elements 16 and read out data from them via a communication line 14. According to the embodiment explained, the measuring elements 16 are formed as read/write heads, which are located at positions A, B and C and are correspondingly labelled with the reference numbers 16a, 16b and 16c. Data carriers or RFID chips 20, which are arranged in the read/write area of the measuring element 16b or 16c and consequently can be read out by the measuring element 16b or 16c, are to be located at positions B and C. The respective data carriers or RFID chips are correspondingly labelled with the reference numbers 16b and 16c.

Carrying out the method begins, for example, in that, using a command
command=0x0010 (CONTINUOUS_MODE)
the user 30 prompts the execution of a command in continuous mode.

According to the preferred embodiment described, the method for operating a measurement system 10 comprises six steps, which are carried out to actuate the measuring elements 16. In the following, steps 202 to 212, in which the evaluation module communicates with the measuring elements 16 via the communication line 14, are explained by way of example with reference to an inventory command, although the method for communication is equally suitable and can be used for other types of command. Steps 202 to 212 are also represented schematically in the exemplary program sequence in FIG. 2B.

According to the embodiment of the method shown, all measuring elements 16 are actuated in the same way, with the result that all measuring elements 16 execute the same command. The communication is effected in a report mode in the bus mode of the measurement system 10.

In step 202, the evaluation module 12 sends the respective command, here an inventory command to all active measuring elements 16 connected to the evaluation module 12 one after the other. The command reads
Inventory*.req(bus address A, report mode on)
wherein "A" represents the bus address allocated to the first measuring element 16. Corresponding commands with differing bus addresses, here B and C, are sent to the other two connected and active measuring elements 16.

The respective measuring elements 16 confirm receipt of the command with
Inventory*.ackn (bus address A)
or a corresponding confirmation with the respectively associated address.

The evaluation module 12 can likewise acknowledge the execution of the command to the user 30, for example returning the response
response=0x0010 (CONTINUOUS_MODE)

The measuring elements 16 then try to send the received command, which represents a continuous mode command, permanently or continuously to the RFID chips 20 potentially arranged in front of them (if one such is arranged in front of the respective measuring elements) over the respective air interfaces 18 between the measuring elements or read/write heads. The continuous sending of the command to the potentially present RFID chips 20 is effected by sending at regular intervals and waiting for a response of an RFID chip, which is located in the read/write area and is prompted to respond by the received command.

Unlike in conventional methods, i.e. unlike the regular bus mode, according to this preferred embodiment of the invention, the continuous or constant command execution by the measuring elements 16 is not signalled by forwarding further cyclic acknowledgements of the measuring elements 16 to the evaluation module 12 via the communication line 14. This offers the advantage that the bus or the communication line 14 is not occupied by such further cyclic acknowledgements but is kept free and thus is kept free for the forwarding of further notifications from the evaluation module 12 to the measuring elements 16.

The execution of step 204 depends on the presence of a data carrier or RFID chip 20 in the read/write area of the respective measuring element 16. The first case exists when a data carrier or RFID chip responds to the command received from the measuring element 16 over the air interface 18 and sends a response to the measuring element 16, such as according to the example at positions B and C. In this case, the measuring elements 16b and 16c detected the measurement data from the respective data carrier or the RFID chip 20b or 20c, wherein the detected measurement data can comprise an identification of the data carrier or RFID chip 20b, 20c and/or other data and/or items of information, which the data carrier or RFID chip 20b, 20c has saved and provides to the measuring element 16b, 16c in response to the command. In another case, in which no data carrier or RFID chip is present in the read/write area, such as at position A, and/or it does not respond to the command sent from the measuring element 16a over the air gap 18 for other reasons, the measuring element 16a is preferably moved over the air gap 18 with continuous sending of the command until a data carrier or RFID chip 20 is present in the read/write area and responds, or a further command to end the continuous sending of the command enters the measuring element 16a.

In step 206, the detected measurement data are buffered in the measuring element 16b, 16c. For this purpose, according to the embodiment explained, the measuring element 16 prepares a response but does not forward it to the evaluation module 12 independently, but rather only buffers it in the measuring element itself. The prepared and buffered response is represented in the exemplary program text as:
Inventory.rsp This response can in particular contain the measurement data which the measuring element 16b, 16c has detected from the read-out data carrier or RFID chip 20b, 20c.

Because, according to the preferred embodiment, the communication line 14 is kept free since the individual measuring elements 16 do not send the responses to the evaluation module 12 via the communication line 14 unrequested, the evaluation module 12 can send the respective desired commands individually to all measuring elements 16 one after the other without the forwarding of the commands being interfered with or blocked by any response of the measuring elements 16 already provided with a command.

Thus, for example, step 202 can be executed for the individual measuring elements 16 one after the other, with the result that all measuring elements 16 are provided with commands one after the other in order for instance to detect, read out and/or otherwise process data carriers or RFID chips 20.

In step 208, the evaluation module 12 reads out the data optionally buffered in the measuring elements 16 via the communication line 14. For this purpose, according to the embodiment explained, the evaluation module 12 sends, preferably cyclically, a command:
GetDataOfReportMode.req
via the communication line 14, to each measuring element 16, which is active and is connected to the evaluation module 12 via the communication line 14, one after the other. If the respective measuring elements 16 have buffered measurement data, the respective buffered measurement data or responses are transmitted to the evaluation module 12 via the communication line 14, which is represented according to the explained example by:
Inventory*.rsp (bus address B, UID*)
wherein UID* represents the transmitted measurement data. The same applies for the measuring element 16c, wherein the address C is indicated for this.

The transmission can come from the evaluation module 12 or the respective measuring element 16, but the transmission is first initiated by the command provided by the evaluation module 12, with the result that an ordered reading out of the buffered measurement data from the individual measuring elements 16 results. However, if a measuring element 16 has not buffered any measurement data, the respective measuring element does not send a reply in response to the above-mentioned command to read out the buffered measurement data. After a timeout, i.e. after a predetermined period of time has passed in which no response or no buffered measurement data are provided by the respective measuring element, the evaluation module 12 recognizes that no measurement data have been buffered in the respective measuring element 16 and consequently no buffered measurement data are to be read out.

According to the embodiment explained, step 208 is executed repeatedly for all measuring elements 16 one after the other. This can alternatively be effected continuously. The read-out measurement data can then be saved in the internal memory of the evaluation module. In an optional step 210, the read-out measurement data can also be issued and/or displayed to the user 30. This is represented in FIG. 2B by
command=0x0011 (GET_DATA_FROM_FIFO)
and
response=0x0011 (GET_DATA_FROM_FIFO, data)

This method makes it possible for all measuring elements 16 to be permanently active in executing commands and, independently from each other, able to recognize, read and/or otherwise process data carriers or RFID chips. Interference in the transmission of the measurement data from the several measuring elements 16 to the evaluation module 14 can be effectively prevented by this method since the detected measurement data from the respective measuring elements are first of all buffered in the measuring element and are then read out from the measuring elements 16 one after the other in an ordered manner by the evaluation module 12.

The permanent or continuous execution of commands by the measuring elements 16 can optionally be ended by a corresponding command which is sent from the evaluation module 12 to the measuring elements 16. For this purpose, in step 212, a reset command is sent to the individual measuring elements 16, which is represented as follows in FIG. 2B:
ResetTransceiverreq(bus address A)

A corresponding command with another address is also sent to the other measuring elements 16 one after the other in order to end the continuous execution of commands in these measuring elements also.

Ending the continuous mode or permanent mode is effected, for example, as a result of a corresponding command by the user:
command=0x0012 (CONTINUOUS_MODE_OFF)
and is preferably confirmed to the user 30 as follows:
response=0x0012 (CONTINUOUS_MODE_OFF).

The present invention provides a method for operating a measurement system 10 with an evaluation module 12 and several measuring elements 16, wherein the evaluation module 12 and the measuring elements 16 are connected via a communication line 14. The method includes detecting measurement data by means of the several measuring elements 16, wherein at least two of the measuring elements 16 detect the measurement data at least partially at the same time, as well as buffering the detected measurement data in the respective measuring element 16 and reading out the measurement data buffered in the measuring elements 16 by means of the evaluation module 12 via the communication line 14. The invention further relates to a measurement system 10.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 10 measurement system
12 evaluation module
14 communication line
16, 16a, 16b, 16c measuring element
18 air gap between a measuring element and a data carrier
20, 20b, 20c data carrier or RFID chip
30 user
202-212 method steps

The invention claimed is:

1. A method for operating a measurement system comprising an evaluation module and several measuring elements, wherein the evaluation module and the measuring elements are connected via a communication line and wherein the method comprises:
   detecting measurement data via the several measuring elements, wherein each of the measuring elements includes a sensor and/or antenna configured to detect the measurement data, wherein at least two of the measuring elements detect the measurement data at least partially at the same time;
   buffering the detected measurement data in the respective measuring element; and
   reading out the measurement data buffered in the measuring elements with the evaluation module via the communication line,
   wherein the sensor and/or the antenna included in each of the measuring elements is configured to detect an environmental parameter selected from the group consisting of: a temperature, an air humidity, an electrical field, a magnetic field, a mechanical contact, a force, electromagnetic waves, optical radiation, infrared radiation, ultraviolet radiation, x-ray radiation, and radioactive radiation.

2. The method according to claim 1, wherein the buffering of the detected measurement data is effected in a buffer memory of the respective measuring element.

3. The method according to claim 1, wherein the reading out of the measurement data buffered in the measuring elements is effected sequentially.

4. The method according to claim 1, wherein at least one of the measuring elements detects measurement data again after buffering is complete.

5. The method according to claim 1, wherein the steps of detecting the measurement data and of buffering by at least one of the measuring elements are effected continuously in an alternating sequence.

6. The method according to claim 1, wherein the measuring elements are operated in parallel.

7. The method according to claim 1 further comprising the provision of at least one command to the several measuring elements by means of the evaluation module, wherein the provision of the at least one command to the measuring elements is effected via the communication line.

8. The method according to claim 7, wherein at least one of the commands is formed as a continuous mode command and prompts the measuring elements alternately to detect and buffer measurement data continuously.

9. The method according to claim 1, wherein the reading out of the buffered measurement data comprises fragmentation of the measurement data into fragments and successive reading out of the fragments.

10. A measurement system, comprising:
    an evaluation module;
    several measuring elements, each of the measuring elements including a sensor and/or antenna configured to detect measurement data; and
    a communication line, which connects the evaluation module and the several measuring elements;
    wherein the detection of the measurement data is effected by the several measuring elements at least partially at the same time, and wherein the measuring elements are configured to buffer the detected measurement data in the respective measuring element;
    wherein the evaluation module is configured to read out the measurement data buffered in the measuring elements via the communication line, and
    wherein the sensor and/or the antenna included in each of the measuring elements is configured to detect an environmental parameter selected from the group consisting of: a temperature, an air humidity, an electrical field, a magnetic field, a mechanical contact, a force, electromagnetic waves, optical radiation, infrared radiation, ultraviolet radiation, x-ray radiation, and radioactive radiation.

11. The measurement system according to claim 10, wherein the measuring elements each comprise a buffer memory and are configured to buffer the detected measurement data in the respective buffer memory.

12. The measurement system according to claim 10, wherein the evaluation module comprises a memory unit and is configured to save the measurement data read out from the measuring elements in the memory unit, wherein the memory unit comprises a FIFO buffer.

13. The measurement system according to claim 10, wherein at least some of the measuring elements each comprise a read/write head or are formed as such.

14. The measurement system according to claim 10, wherein the measurement system is formed in accordance with the RS-485 standard.

15. A computer program product which comprises a non-volatile, computer-readable memory medium on which an executable program code is saved, which is configured to prompt a measurement system to carry out a method according to claim 1.

16. The method according to claim 1, wherein each of the measuring elements includes an antenna configured to detect measurement data.

17. The method according to claim 1, wherein each of the measuring elements includes a radio frequency identification (RFID) read/write head.

* * * * *